No. 649,393. Patented May 8, 1900.
L. V. BENÉT & H. A. MERCIÉ.
SEMI-AUTOMATIC GUN.
(Application filed Jan. 15, 1900.)

(No Model.) 6 Sheets—Sheet 1.

Witnesses

Inventors

No. 649,393. Patented May 8, 1900.
L. V. BENÉT & H. A. MERCIÉ.
SEMI-AUTOMATIC GUN.
(Application filed Jan. 15, 1900.)
(No Model.) 6 Sheets—Sheet 3.

No. 649,393. Patented May 8, 1900.
L. V. BENÉT & H. A. MERCIÉ.
SEMI-AUTOMATIC GUN.
(Application filed Jan. 15, 1900.)
(No Model.) 6 Sheets—Sheet 5.

UNITED STATES PATENT OFFICE.

LAURENCE V. BENÉT AND HENRI A. MERCIÉ, OF PARIS, FRANCE.

SEMI-AUTOMATIC GUN.

SPECIFICATION forming part of Letters Patent No. 649,393, dated May 8, 1900.

Application filed January 15, 1900. Serial No. 1,519. (No model.)

*To all whom it may concern:*

Be it known that we, LAURENCE V. BENÉT, a citizen of the United States, and HENRI A. MERCIÉ, a citizen of the French Republic, both residing at Paris, France, have invented certain new and useful Improvements in Semi-Automatic Guns; and we do hereby declare the following to be a full, clear, and exact description of the invention, such as will enable others skilled in the art to which it appertains to make and use the same.

Our invention relates to that class of guns employing fixed metallic ammunition, and more particularly to that class of guns wherein the breech mechanism is operated by means of a rotating or swinging hand-lever, and especially to guns mounted on one of the forms of the so-called "automatic recoil-mounts."

The object of our invention is to provide means by which the breech is automatically opened upon the discharge of the piece, with consequent extraction and ejection of the empty cartridge-case; means for automatically locking the breech in the "open" position; means for automatically unlocking the breech upon the introduction of a fresh cartridge, and means for automatically closing the breech when unlocked.

A secondary object of our invention is to provide a mechanism performing the above-stated functions which may be applied to existing guns without essential modification of the breech mechanism and which will, within reasonable limits, be independent of the amount of recoil realized by each round fired and of the precision with which the gun returns to the "in-battery" or firing position.

In the accompanying drawings, which illustrate our invention, it is shown as applied to the well-known Hotchkiss quick-firing gun mounted on the well-known Fletcher recoil-mount.

In the following description the mechanism of gun and mount will be described and referred to only in so far as it may relate to and coöperate with our invention.

The same parts are indicated by the same letters throughout the several views.

A represents the gun-body, which is mounted in the sleeve A', which slides in the cradle B, supported by the trunnions B' on the mount C. To this sleeve A' the recoil-cylinder $A^2$ is rigidly attached, and the piston-rod $B^3$ of this recoil-cylinder is secured to the yoke $B^2$ at the forward end of the cradle beneath the gun, as is well known in the Fletcher mount referred to. The interior of the cylinder is provided with a recoil-spring under sufficient compression to restore the gun to the initial or firing position after recoil, and the shock of the recoil may be taken up by this spring alone or by fluid contained in the interior of the cylinder A², but the details of the recoil-cylinder and of the spring contained therein do not constitute a part of our present invention and will not be further described.

Figure 8:
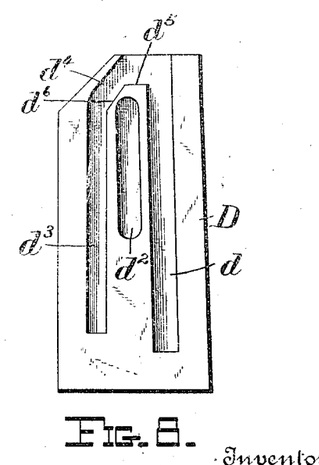
Fig. 8 is a side elevation of the left side of the block, both as seen from the rear.

The breech-block D is provided with vertical grooves d, one on either side thereof, to engage the ribs a in the housing in rear of the bore of the gun. On one side of the block is a curved groove d' to receive the wrist-pin e² at the end of the arm E², secured to the rock-shaft E, which is journaled at one side of the gun-breech. This rock-shaft is rotated through the requisite angle either by the hand-lever E' or by the automatic mechanism connected to the arm E³, as will be hereinafter described. The opposite side of the block D is provided with the usual slot d² to engage the stop-pin a⁰, which limits the vertical travel of the block, and also with an extractor-groove d³ with cam-faces d⁴ and d⁶ and the flattened shoulder d⁵, whose engagement with the extractor will be hereinafter described.

The breech-block may be raised or lowered by hand in the usual manner well known in the art and needs no further description except in connection with the automatic gear.

The automatic mechanism in its various positions is shown in Figs. 1 to 6 of the drawings, where F represents a sliding bar pivoted at e³ to the arm E³, which may be either integral with the hand-lever E' or may be a separate member attached to the rock-shaft E. The rear end of this sliding bar F is provided with a hook f to engage the operating-spring G, while the front end of the bar is curved, as at f', to engage the arm k of the bell-crank lever K, which bell-crank lever is pivoted on the pin b⁵ and has its upper end k' normally engaging a hook A³, attached to the sleeve A'. The forward end of the sliding bar F projects into the guide-sleeve H, which is pivoted on the pin b⁴, these pins b⁴ and b⁵ being mounted in a frame or on a bracket B⁴, secured to the cradle B. The upper portion of the guide-sleeve H is slotted, as at h, to permit the passage therethrough of the arm k of the bell-crank lever K.

Figure 1:
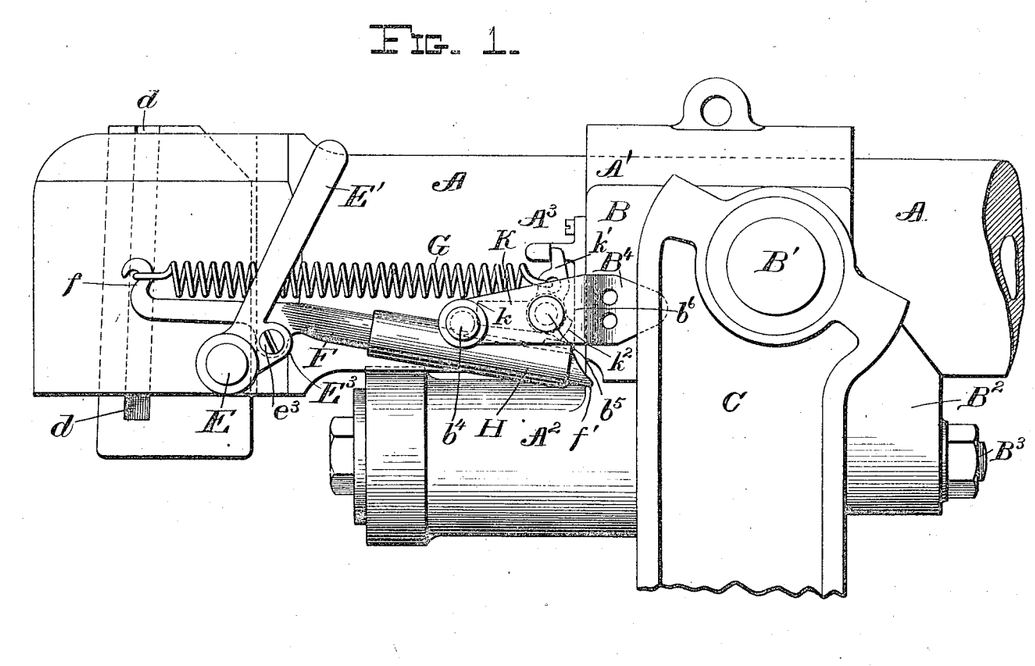
Figure 1 represents a side elevation of the gun in the firing position—that is, with the breech-block closed and locked.
Figure 2:
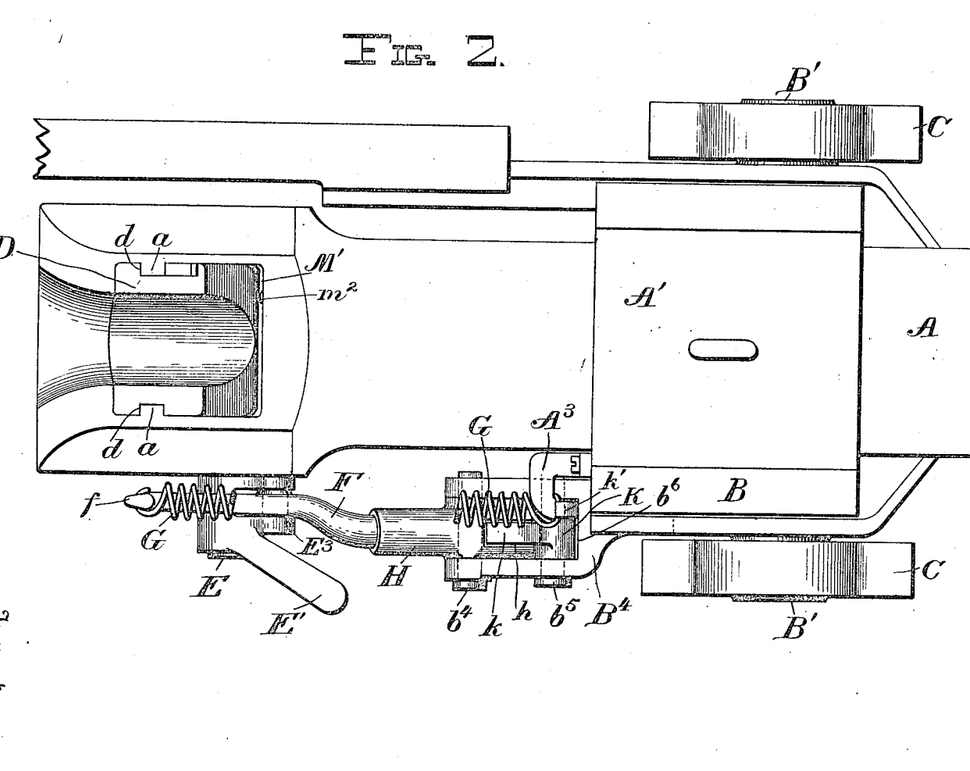
Fig. 2 is a plan view of the device shown in Fig. 1.
Figure 3:
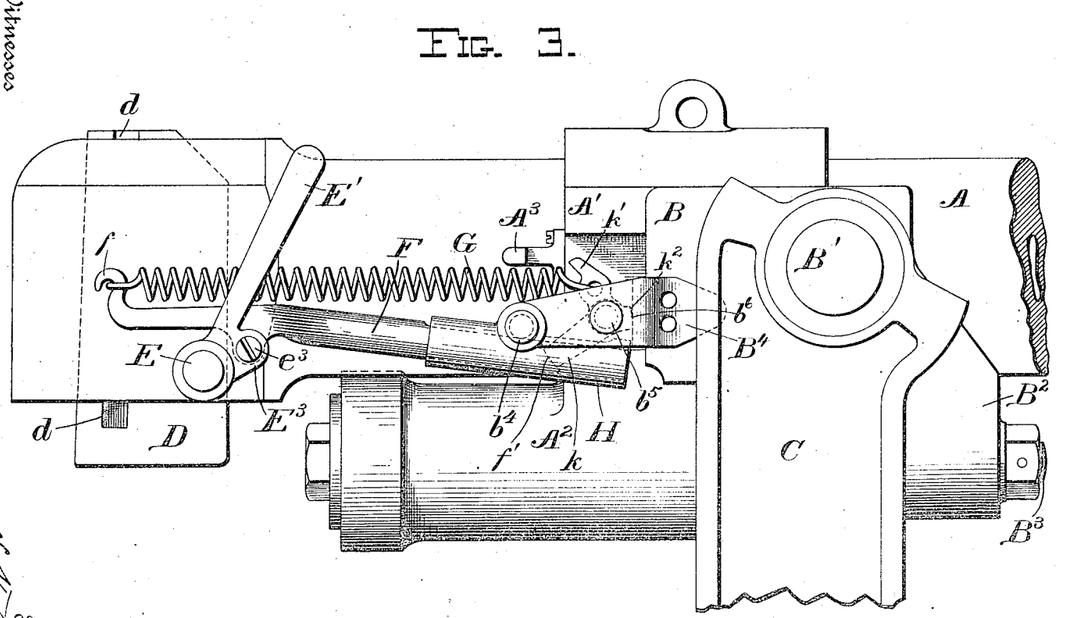
Fig. 3 is a side elevation of the gun and mount, showing the gun in the position it assumes after it has partly completed the counter-recoil, but before the breech-block has been even partly unlocked.
Figure 4:
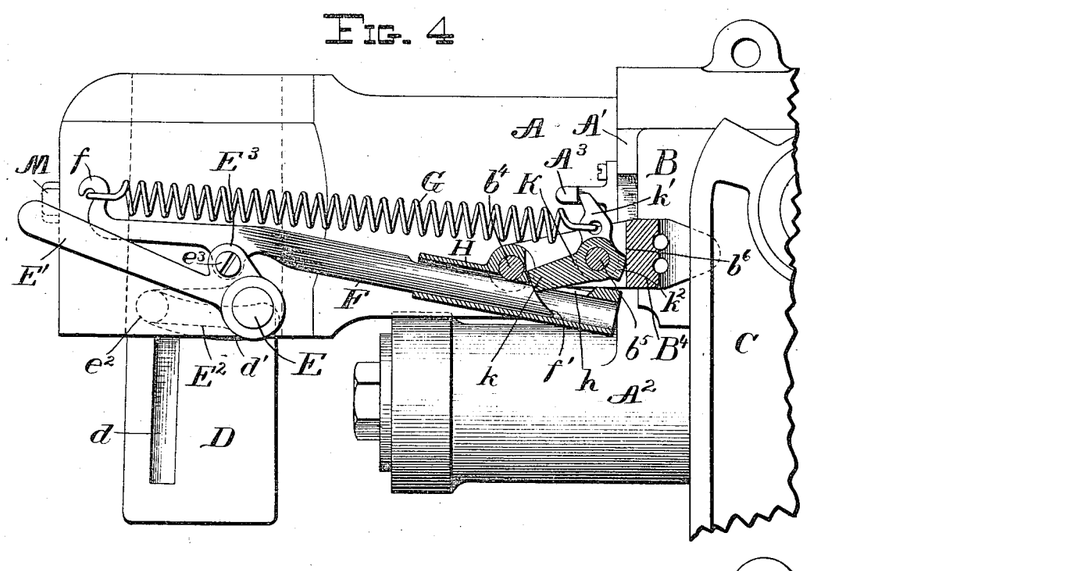
Fig. 4 shows a gun just before it has completed the counter-recoil, parts being shown in section.
Figure 5:
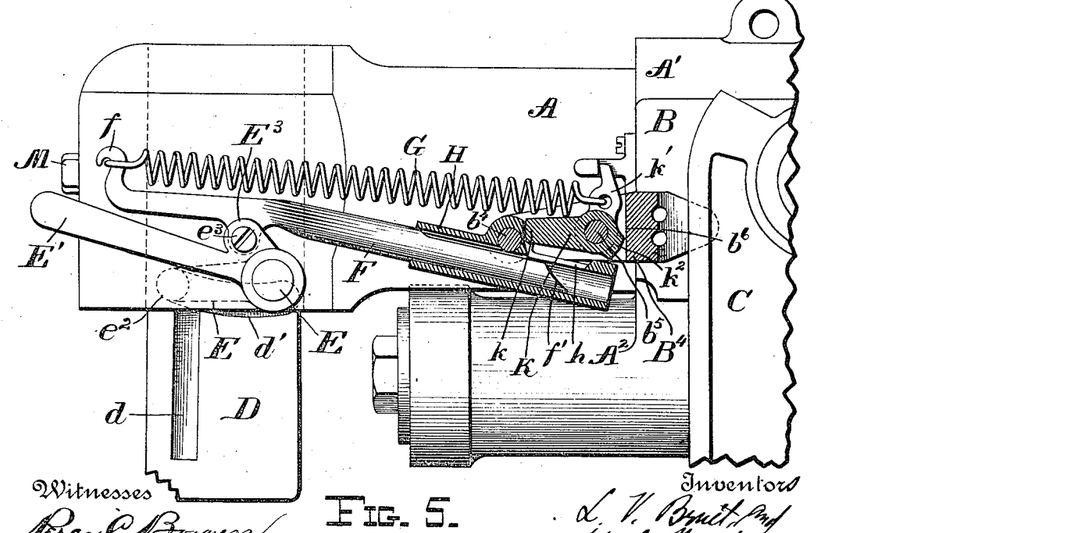
Fig. 5 shows a gun after it has completed the counter-recoil, showing the breech-block open and ready for the automatic action, parts being shown in section.
Figure 6:
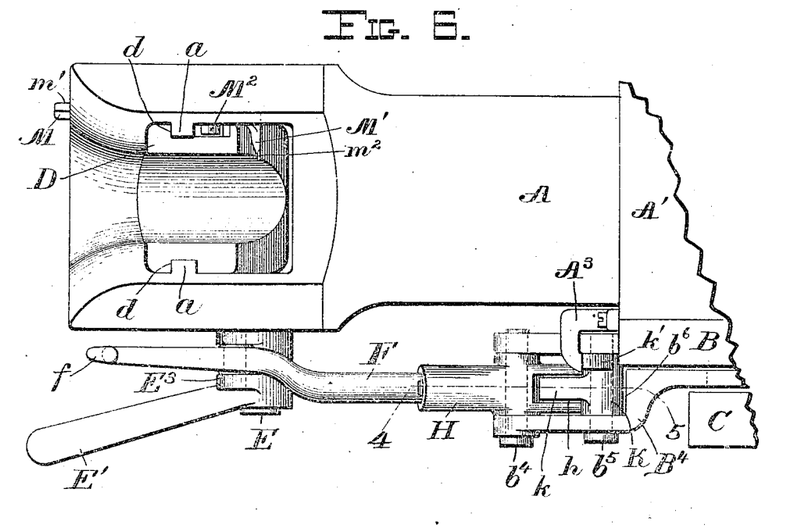
Fig. 6 represents a plan view of the gun with the breech-operating mechanism in the position shown in Fig. 5, the operating-spring being omitted for the sake of clearness.
Figure 7:
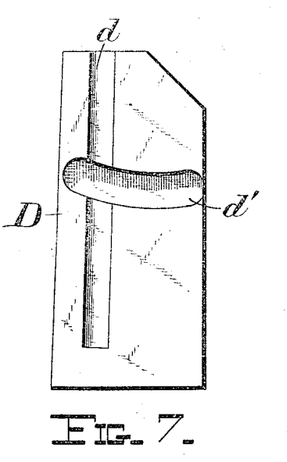
Fig. 7 is a side elevation of the right side of the block.

Omitting for the present the operation of the extractor and assuming the parts to be in the initial position, (indicated in Figs. 1 and 2,) suppose the gun to be fired. The recoil of the gun will drag the sliding bar F rearward, causing the hook f thereon to stretch out the spring G, and the tendency of this spring will be to hold the rock-shaft E in the initial position and to hold the breech-block up. As this bar F slides rearward the arm k of the bell-crank lever will slide along the top of this bar until the curved end f' of the bar passes beneath the outer end of this arm k, at which time the spring G will cause this arm k to snap down in front of this curved face f', the parts then being in the position indicated in Fig. 2. Further rotation of the bell-crank lever K about its pivot may be arrested either by the arm k striking the bottom of the guide-sleeve H; but preferably this is provided for by a separate toe k², which finds a bearing on the face b' in the frame B⁴. The gun now may travel farther rearward without affecting the position of the parts in any way; but as soon as the recoil has been completed and the gun moves forward again on counter-recoil to the position shown in Fig. 3 the face f' on the sliding bar F will strike the arm k. The gun continues moving forward under the energy of the counter-recoil; but the forward motion of the sliding rod F being arrested it forces the arm E³ backward, turning the rock-shaft E and moving the breech-block downward to the open position. Before the forward motion of the gun on counter-recoil has been completed the hook A³ strikes the upper arm k' of the bell-crank lever, tripping the arm k' upward and releasing the engagement between this arm k and the curved face f', as indicated in Fig. 4, until finally the parts of the automatic attachment assume the position indicated in Fig. 5, and if the block were not held down by some means it would be moved by the spring G and parts connecting the same to the rock-shaft to the upper or closed position. It therefore becomes necessary to provide means for automatically holding the block in the lower or open position and for automatically releasing the same, and this we accomplish by means of the extractor mechanism, which will now be described.

Figure 11:
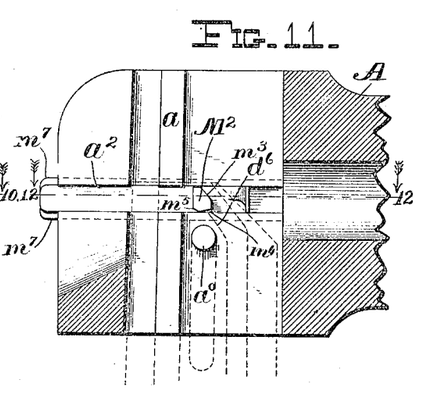
Fig. 11 represents a similar section to that shown in Fig. 9, except that the extractor is in the position it assumes when the breech-block is lowered to the loading position, at which time the extractor holds the block against upward motion. The block is indicated in dotted lines in this figure.
Figures 14, 15:
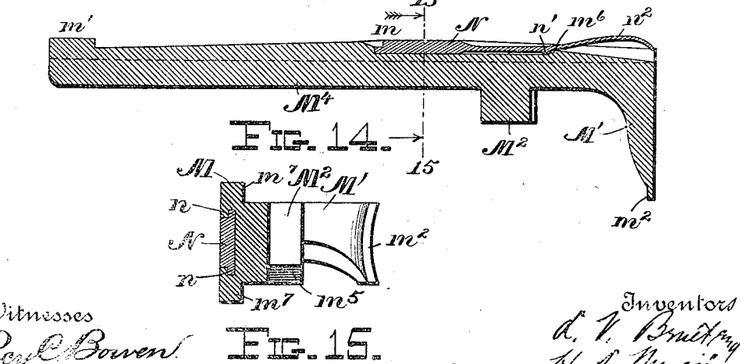
Fig. 14 represents a section along the line 14 14 of Fig. 13 and looking down.
Fig. 15 represents a section along the line 15 15 of Fig. 14 and looking to the right.

At one side of the breech-housing we provide a guideway a' for the extractor M, which guideway has overhanging lips a² engaging the guide-ribs m⁷ on either edge of the extractor, as shown in Figs. 11 and 15. The extractor is provided with the claw M', having a nib m², adapted to engage in front of the flange of the cartridge-case. The face of the extractor next the breech-block is provided with a cam-lug M², having cam-faces m³ and m⁵ and an engaging shoulder m⁴. This cam-lug M² engages in the extractor-groove d³ in the side of the breech-block, which extractor-groove is vertical throughout the greater portion of its length, but is provided near the top of the block with cam-surfaces d⁴ and d⁶, while the cam-surface d⁶ terminates in the stop-shoulder d⁵. (See Fig. 8.) On the opposite side of the extractor from the lug M² we provide a catch m' at the rear end of the extractor, and the face of the extractor is rounded or humped, as at m, so as to allow the extractor a slight rotation about a vertical axis. In order to permit this, the guide-ribs m⁷ do not fit snugly beneath the guide-lips a², but there is some little horizontal play allowed. On this humped face of the extractor the spring N is secured, preferably in the manner shown in Figs. 14 and 15, where the ribs n of the spring slide under overhanging lips until the spring is pushed home, when a boss n' engages in rear of a projection m⁶, and thus the spring is held in place, but at the same time it may be readily assembled or detached when desired. The forward end of this spring N is rounded outward, as at $n^2$, (see Fig. 14,) and this rounded portion tends, when the extractor is in the breech-housing, to swing the claw of the extractor inward toward the axis of the bore and to cause the catch $m'$ to press outward.

Figure 9:
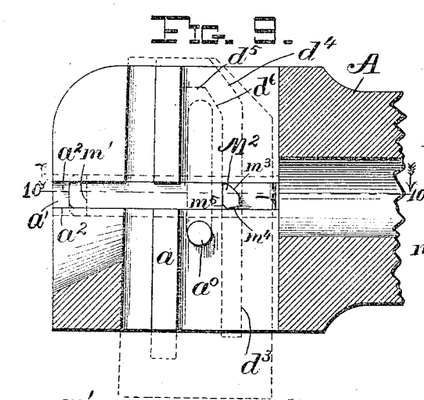
Fig. 9 represents a central vertical section through the gun-breech, with the breech-block indicated in dotted lines, and shows the extractor in its guideways and in the position it assumes when the breech is closed.
Figures 10, 12, 13:
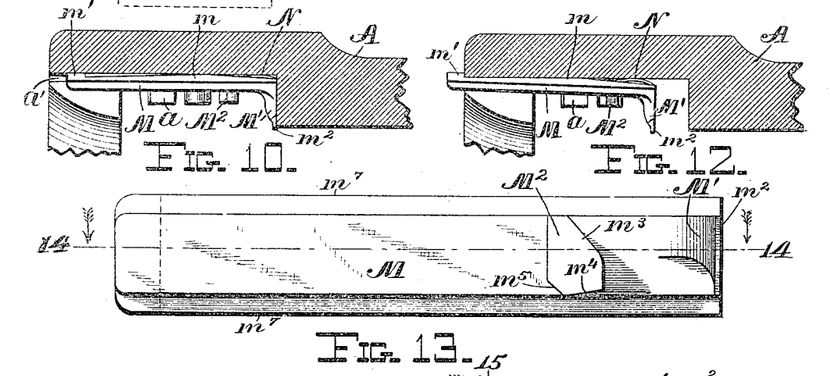
Fig. 10 is a section along the line 10 10 of Fig. 9 and looking down.
Fig. 12 represents a section along the line 12 12 of Fig. 11 looking down.
Fig. 13 is an enlarged detail view showing the extractor removed from its guideways.

Suppose the extractor to be in the position shown in Fig. 9 and engaging in the extractor-groove shown in dotted lines in that figure, the breech-block (indicated in dotted lines) being in the upper or closed position. Now if the breech-block be lowered to the lower or open position the cam-face $m^3$ on the lug M will engage the cam-surface $d^4$ on the breech-block, camming the extractor to the rear until finally the shoulder $m^4$ is forced rearward in a position above the stop-shoulder $d^4$ on the block. As the extractor is forced rearward the spring N will tend to throw the catch $m'$ outward until when this catch passes in rear of the face of the breech of the gun the said catch will spring over said face, locking the extractor against forward motion. After the breech-block has reached its lowest position the action of the automatic gear will lift it slightly, when the shoulder $m^4$ on the lug $M^2$ will engage the stop-shoulder $d^5$ on the block and the block will be held down in the open position.

In order to release the block, it will be necessary to move the extractor forward again, and this may be either done by hand or may be done automatically in the act of reloading the gun. To do this by hand, it is sufficient to merely press inward on the rear end of the extractor and then shove the extractor forward until the cam-face $m^5$ on the cam-lug $M^2$ engages the cam-surface $d^6$ on the block, when the automatic mechanism will cause the block in its upward motion to cam the extractor forward and the automatic mechanism will close the breech. The same result is automatically accomplished in reloading when the rim of the cartridge-case strikes the claw of the extractor, pivoting the same outward about its hump $m$ and releasing the catch $m'$, and the extractor is dragged forward until the cam-face $m^5$ engages the cam-surface $d^6$, as before described. Thus it will be seen that when the gun is fired the breech will remain closed until the gun has moved forward somewhat on counter-recoil. Then the breech-block will be lowered automatically, the extractor will be cammed automatically rearward until it locks the breech-block in the lowered position, and it will remain in this position, holding the breech-block open until released either by hand or automatically in reloading the gun.

As soon as the breech-block is released the automatic attachment will restore the parts to the initial or firing position.

It will be evident that if the pin $e^3$ be taken out or the spring G be disengaged from the hook $f$ the breech mechanism may be operated by hand in the usual way. It will also be obvious that the herein-described semi-automatic attachment may be applied to operate the breech mechanisms of various types of guns already built without any expensive alterations and that other means for holding the breech-block in the lowered or open position may be provided, if desired, than the sliding extractor constructed as we have described it. Furthermore, it will be obvious that the sliding extractor as herein described may be used with other well-known types of semi-automatic gear.

While we have described our invention as applied to the Hotchkiss gun on a Fletcher mount, it will be obvious that the invention is applicable to almost any of the well-known forms of recoil-mount now in use, and we do not intend to confine our invention to any particular type of mount, but intend to use the same on any mounts to which it may be applicable. In a similar way we have shown the invention applied to the well-known Hotchkiss single-fire cannon; but with or without minor changes the apparatus may be applied to many of the well-known types of rapid-fire guns in which the operation of opening and closing the breech is performed by reverse motions of a hand-lever or rock-shaft. We therefore do not intend to limit our invention to any particular type of rapid-fire gun.

Having thus described our invention, what we claim, and desire to secure by Letters Patent of the United States, is—

1. In a rapid-fire gun, the combination with a breech-block and automatic mechanism for moving this block into and out of the closed position, the said block having a cam-groove therein, of a sliding extractor rounded on the face opposite the claw and provided with a catch on said rounded face to engage the gun-body, and engage the breech-block, substantially as described.

2. In a rapid-fire gun, the combination with a vertically-movable breech-block and automatic mechanism for moving this block into and out of the closed position, the said block having a cam-groove therein, of a longitudinally-sliding extractor rounded on the face opposite the claw and provided with a catch on said rounded face to engage the gun-body, and a cam-lug to engage the breech-block, substantially as described.

3. A sliding extractor for use in automatic guns, comprising a bar adapted to engage the breech-block, with a claw on one side of said bar, a catch and a rounded face on the opposite side of said bar, and a spring adapted to press the claw of the extractor in toward the axis of the bore of the gun, substantially as described.

4. A sliding extractor for use in automatic guns, comprising a bar with a cam-lug and a claw on one side of said bar, a catch and a rounded face on the opposite side of said bar, and a spring adapted to press the claw of the extractor in toward the axis of the bore of the gun, substantially as described.

5. A sliding extractor for use in automatic guns, comprising a bar with a cam-lug and a claw on one side of said bar, a catch to engage the gun-body, and a rounding face on the opposite side of said bar, and a spring detachably secured to said extractor and adapted to press the claw of the extractor in toward the axis of the bore of the gun, substantially as described.

6. A sliding extractor for use in automatic guns, comprising a bar with a cam-lug and a claw on one side of said bar, a catch to engage the gun-body, and a rounded face on the opposite side of said bar, and a curved spring secured to said extractor and adapted to press the claw of the extractor in toward the axis of the bore of the gun, substantially as described.

7. In a breech-loading gun, the combination with a movable breech-block, of a sliding extractor curved to rock on an axis transverse to its line of motion and engaging the said breech-block and the gun, and means for moving said breech-block, substantially as described.

8. In a breech-loading gun, the combination with a sliding breech-block, of a sliding extractor curved to rock on an axis transverse to its line of motion and engaging the said breech-block and the gun, and means for moving said breech-block, substantially as described.

9. In a breech-loading gun, the combination with a movable breech-block, of a sliding extractor curved to rock on an axis transverse to its line of motion and engaging the said breech-block and the gun, means for releasing said extractor and automatic means for moving said breech-block, substantially as described.

10. In a breech-loading gun, the combination with a sliding breech-block, of a sliding extractor curved to rock on an axis transverse to its line of motion and engaging the said breech-block and the gun, means for releasing said extractor and automatic means for moving said breech-block, substantially as described.

11. An automatic gear for recoil-mounts for breech-loading guns comprising a rock-shaft for operating the breech-block, an arm secured to said rock-shaft, a sliding bar pivoted to said arm, a spring connected to said sliding bar and to a non-recoiling part of said mount, and means controlled by said spring for arresting the motion of said sliding bar on counter-recoil, substantially as described.

12. An automatic gear for recoil-mounts for breech-loading guns comprising a rock-shaft for operating the breech-block, an arm secured to said rock-shaft, a sliding bar pivoted to said arm, a lever pivoted to a non-recoiling part of said mount and having an arm engaging said sliding bar on counter-recoil, and a spring connecting said lever and said sliding bar, substantially as described.

13. An automatic gear for recoil-mounts for breech-loading guns comprising a rock-shaft for operating the breech-block, an arm secured to said rock-shaft, a sliding bar, pivoted to said arm, a hook on the gun, a bell-crank lever pivoted to a non-recoiling part of the mount and having one arm engaging said hook and the other arm engaging said sliding bar on counter-recoil, and a spring connecting said lever and said sliding bar, substantially as described.

14. In a breech-loading gun, the combination with a breech-block and an extractor automatically operated by said block to withdraw the empty cartridge-case and to lock the said block in the open position, of a rock-shaft for operating the breech-block, an arm secured to said rock-shaft, a sliding bar pivoted to said arm, a spring connected to said sliding bar and to a non-recoiling part of said mount, and means controlled by said spring for arresting the motion of said sliding bar on counter-recoil, substantially as described.

15. In a breech-loading gun, the combination with a breech-block and an extractor automatically operated by said block to withdraw the empty cartridge-case and to lock the said block in the open position, of a rock-shaft for operating the breech-block, an arm secured to said rock-shaft, a sliding bar pivoted to said arm, a bell-crank lever pivoted to a non-recoiling part of said mount and having an arm engaging said sliding bar on counter-recoil, a hook on the gun engaging the opposite arm of said bell-crank lever, and a spring connecting said lever and said sliding bar, substantially as described.

16. An automatic gear for recoil-mounts for breech-loading guns comprising a rock-shaft for operating the breech-block, an arm secured to said rock-shaft, a sliding bar pivoted to said arm, a spring connected to said sliding bar and to a non-recoiling part of said mount, and means controlled by said spring for arresting the motion of said sliding bar on counter-recoil, and for automatically releasing the same, substantially as described.

17. An automatic gear for recoil-mounts for breech-loading guns comprising a rock-shaft for operating the breech-block, an arm secured to said rock-shaft, a sliding bar pivoted to said arm, a lever pivoted to a non-recoiling part of said mount and having an arm engaging said sliding bar on counter-recoil, and automatically releasing same, and a spring connecting said lever and said sliding bar, substantially as described.

18. In a breech-loading gun, the combination with a breech-block and an extractor automatically operated by said block to withdraw the empty cartridge-case and to lock the said block in the open position, of a rock-shaft for operating the breech-block, an arm secured to said rock-shaft, a sliding bar pivoted to said arm, a spring connected to said sliding bar and to a non-recoiling part of said mount, and means controlled by said spring for arresting the motion of said sliding bar on counter-recoil, and for automatically releasing said bar, substantially as described.

19. In a breech-loading gun, the combination with a breech-block and an extractor automatically operated by said block to withdraw the empty cartridge-case and to lock the said block in the open position, of a rock-shaft for operating the breech-block, an arm secured to said rock-shaft, a sliding bar pivoted to said arm, a lever pivoted to a non-recoiling part of said mount and having an arm engaging said sliding bar on counter-recoil, a spring connecting said lever and said sliding bar, and means for automatically disengaging said lever from said bar, substantially as described.

20. An automatic gear for recoil-mounts for breech-loading guns comprising a rock-shaft for operating the breech-block, an arm secured to said rock-shaft, a sliding bar pivoted to said arm, a pivoted guide-sleeve for said bar, a spring connected to said sliding bar and to a non-recoiling part of said mount, and means controlled by said spring for arresting the motion of said sliding bar on counter-recoil, substantially as described.

21. An automatic gear for recoil-mounts for breech-loading guns comprising a rock-shaft for operating the breech-block, an arm secured to said rock-shaft, a sliding bar pivoted to said arm, a slotted pivoted guide-sleeve for said bar, a lever pivoted to a non-recoiling part of said mount and having an arm passing through the slot in said sleeve and engaging said sliding bar on counter-recoil, and a spring connecting said lever and said sliding bar, substantially as described.

22. An automatic gear for recoil-mounts for breech-loading guns comprising a rock-shaft for operating the breech-block, an arm secured to said rock-shaft, a sliding bar pivoted to said arm, a slotted pivoted guide-sleeve for said bar, a hook on the gun, a bell-crank lever pivoted to a non-recoiling part of the mount and having one arm passing through said slot and engaging said hook and the other arm engaging said sliding bar on counter-recoil, and a spring connecting said lever and said sliding bar, substantially as described.

23. In a breech-loading gun, the combination with a breech-block and an extractor automatically operated by said block to withdraw the empty cartridge-case and to lock the said block in the open position, of a rock-shaft for operating the breech-block, an arm secured to said rock-shaft, a sliding bar pivoted to said arm, a pivoted guide-sleeve for said bar, a spring connected to said sliding bar and to a non-recoiling part of said mount, and means controlled by said spring for arresting the motion of said sliding bar on counter-recoil, substantially as described.

24. In a breech-loading gun, the combination with a breech-block and an extractor automatically operated by said block to withdraw the empty cartridge-case and to lock the said block in the open position, of a rock-shaft for operating the breech-block, an arm secured to said rock-shaft, a sliding bar pivoted to said arm, a slotted pivoted guide-sleeve for said bar, a lever pivoted to a non-recoiling part of said mount and having an arm passing through said slot and engaging said sliding bar on counter-recoil, and a spring connecting said lever and said sliding bar, substantially as described.

25. In a breech-loading gun, the combination with a vertically-movable block and a sliding extractor automatically operated by said block to withdraw the empty cartridge-case and to lock the said block in the open position, of a rock-shaft for operating the breech-block, an arm secured to said rock-shaft, a sliding bar pivoted to said arm, a lever pivoted to a non-recoiling part of said mount and having an arm engaging said sliding bar on counter-recoil, and a spring connecting said lever and said sliding bar, substantially as described.

26. In a breech-loading gun, the combination with a sliding breech-block and a transversely-sliding extractor automatically operated by said block to withdraw the empty cartridge-case and to lock the said block in the open position, of a rock-shaft for operating the breech-block, an arm secured to said rock-shaft, a sliding bar pivoted to said arm, a guide-sleeve for said sliding bar, a lever pivoted to a non-recoiling part of said mount and having an arm engaging said sliding bar on counter-recoil, and a spring connecting said lever and said sliding bar, substantially as described.

In testimony whereof we affix our signatures in presence of witnesses.

LAURENCE V. BENÉT.
HENRI A. MERCIÉ.

Witnesses as to signature of L. V. Benét:
J. STEPHEN GIUSTA,
GUSTAVE R. THOMPSON.

Witnesses as to signature of H. A. Mercié:
TH. FAVARGE,
CHARLES KURER.